Feb. 7, 1933.  W. R. HILDEBRAND  1,896,310
WATER FILTER
Filed Dec. 11, 1929   2 Sheets-Sheet 1
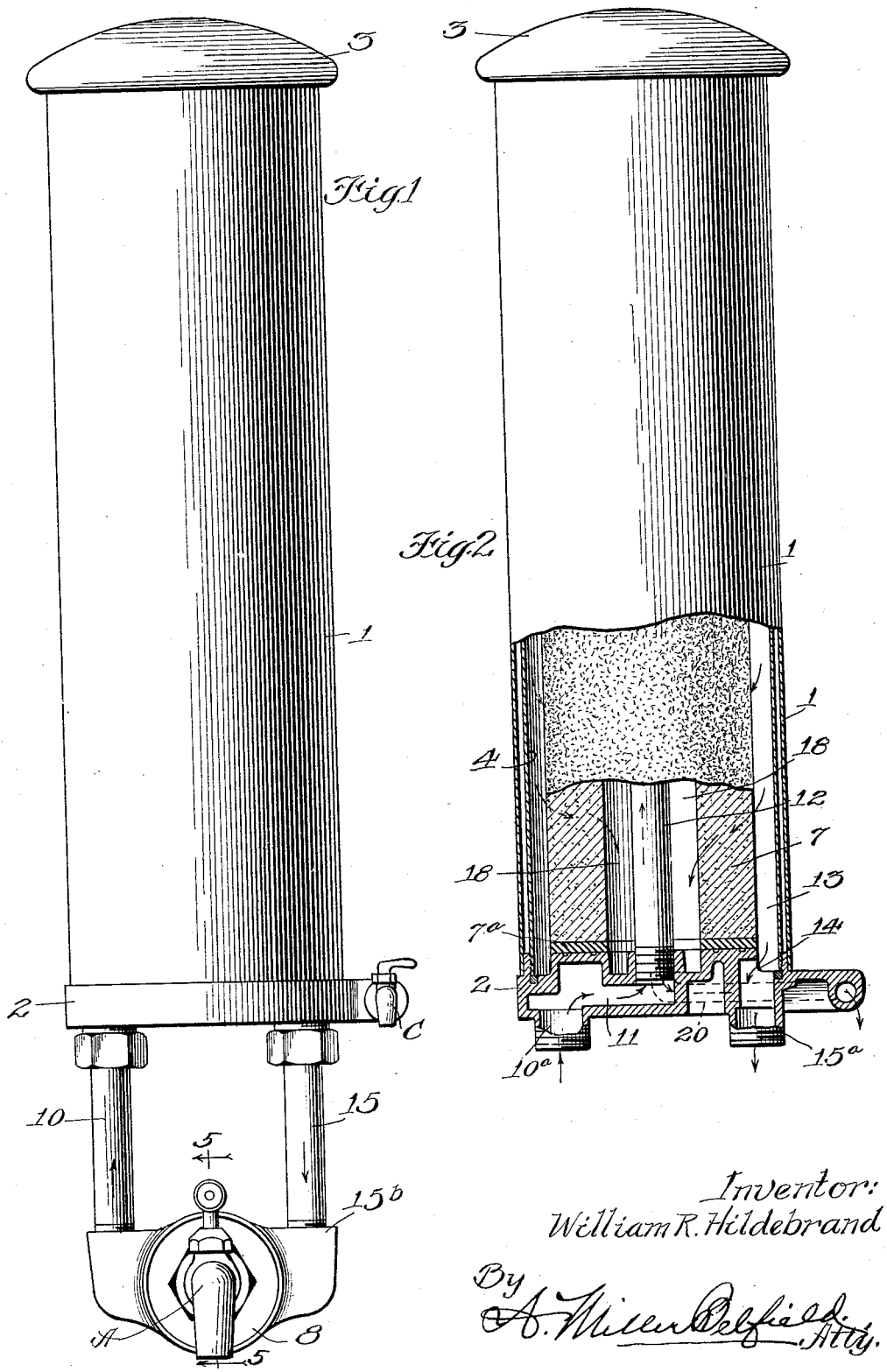
Inventor:
William R. Hildebrand

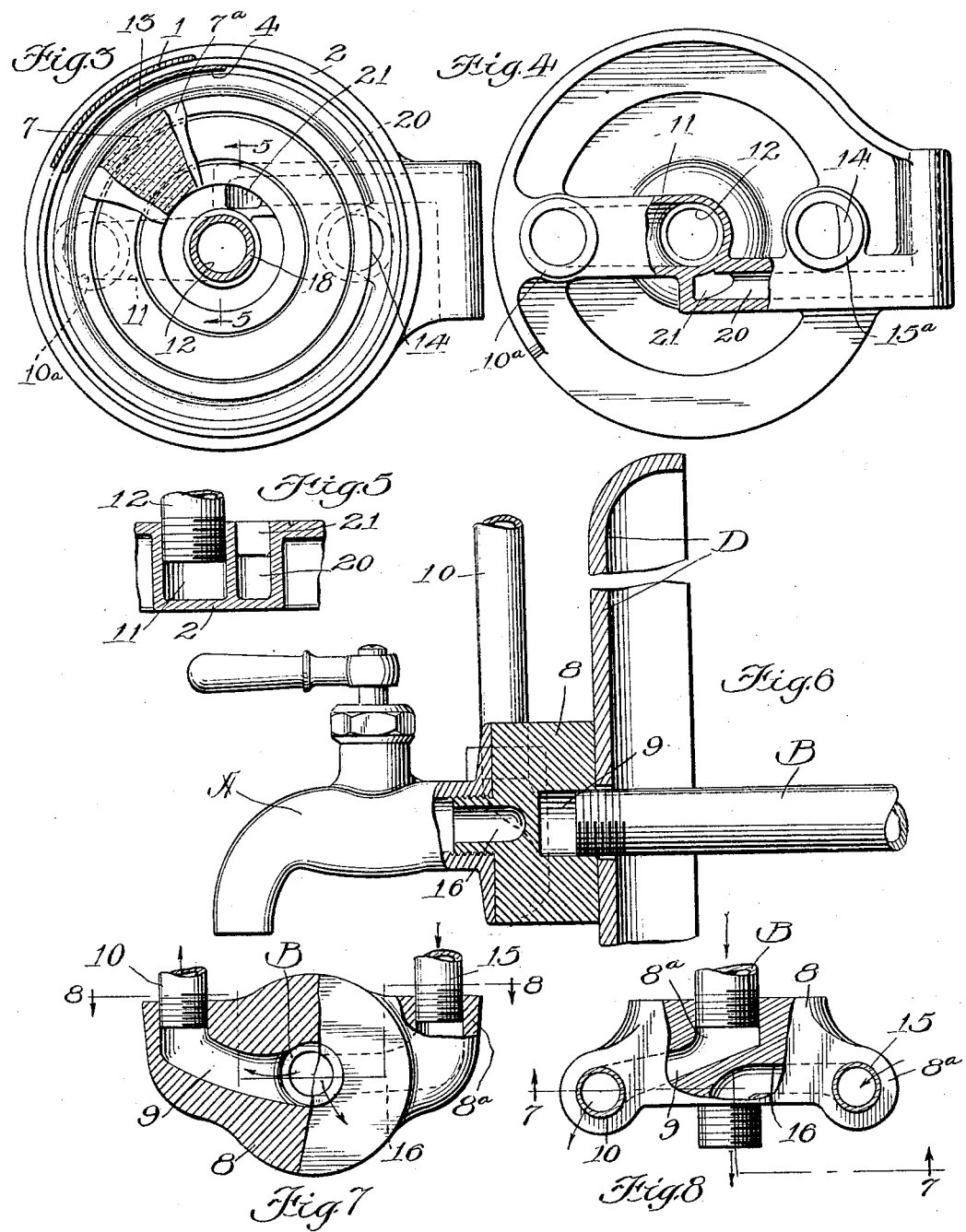

Patented Feb. 7, 1933

1,896,310

UNITED STATES PATENT OFFICE

WILLIAM R. HILDEBRAND, OF CHICAGO, ILLINOIS

WATER FILTER

Application filed December 11, 1929. Serial No. 413,381.

This invention relates to water filters, particularly to the type used for filtering drinking water and water used for domestic purposes that requires purification.

One of the objects of the invention is to produce a filter that will be economical of manufacture and of use.

Another object of the invention is to provide means whereby the water may be run through the filtering medium in the device or switched so as to clean the impurities accumulated in the filter chamber.

Another object of the invention is to so connect the device to its source of supply that upon drawing water by by-passing it to be used for purposes not needing purification, a fresh quantity of water will be supplied for filtering.

Another object is to attain these and other ends which will appear and be pointed out in the claims.

In the drawings:

Fig. 1 is an elevation of the filter shown as connected for use;

Fig. 2 is an elevation with parts in section and parts broken away to disclose certain features of construction;

Fig. 3 is a top plan view of a fitting which forms the bottom of the filter body;

Fig. 4 is a bottom view of the part shown in Fig. 3;

Fig. 5 is a detail view of one of the ports taken as indicated at the line 5—5 on Fig. 3;

Fig. 6 is a section at the line 5—5, taken on Fig. 1 showing the filter mounting and the way it is connected to a supply pipe;

Figs. 7 and 8 are structures disclosing detail views of the lower fitting taken as indicated at the lines 7—7 and 8—8 of Figs. 8 and 7, respectively.

The filter here shown is mounted for use by first disconnecting the usual service faucet A and interposing a fitting of the device between it and the service pipe B, which serves also to support the entire device and mounted against the usual splash apron indicated at D. When filtered water is to be used the faucet C of the filter is opened and unfiltered water as supplied through pipe B is forced through the filtering medium of the device; the usual water pressure is calculated to be sufficient for this purpose. The impure matter in the water is arrested by this filtering medium. When faucet A is opened, water is drawn directly from the service pipe B, that is, this faucet does not cause the water to course through the filtering medium, but only through a part of the device, changing and renewing the water content thereof and also washing away the matter floating in the outer filter chamber.

An outer shell 1 extends between the bottom fitting 2 and the cap member 3 and surrounds an inner shell 4, which is the body proper. The shell is spaced away from the body shell forming a space. The filtering medium indicated at 7 may be of the nature of porous stone, or the like, and is of sufficient surface extent and volume so as to permit an amount of water to pass through, equal to the capacity of the filter hydrant C. This filter medium is preferably proportioned to occupy almost all of the space within the shell 4 so that there will be a minimum quantity of water standing in the receptacle awaiting purification, and also to more readily flush the impurities of filtration upon opening the faucet A when water is drawn off that does not require purification.

A convenient arrangement for mounting the device is by the fitting 8, shown in detail in Figs. 6, 7 and 8. The service pipe B enters the fitting at 8ª and communicates through a duct 9 with a pipe 10; this pipe enters the bottom fitting 2 at 10ª and leads the water through the port 11 and the central vertical pipe 12.

If unfiltered water is now to be drawn, the faucet A is opened and the water led into the device through the pipe 12, filling the interspace 13 between the shell 4, and the filtering element 7 is caused to pass through the port 14 (in the fitting 2 shown in Figs. 2 and 3), which communicates with the space 13 and thence down through the pipe 15, connected to the fitting 2 at 15ª and at 8ª to the fitting 8, in which is a duct 16 which leads to the faucet A.

The filtering stone 7 is in the form of an open-ended hollow cylinder and is mounted with its lower end closely sealed against leakage by the gasket 7ª, upon which the casing 4 is screwed down tightly.

Water admitted to the interspace 13, by virtue of the porosity of the element 7 seeps therethrough to the space 18 between it and the central pipe 12. This space is in communication with the faucet C through the duct 20 and the portway 21 in the fitting 2, shown in Figs. 3, 4 and 5.

As long as the faucet A remains closed and the faucet C is open, water will course through from pipe B, through duct 9 (in the fitting 8) and pipe 10 to duct 11 in bottom casting 2, communicating with the central pipe 12 and through a suitable outlet (not shown) at the top end of the pipe 12 to the interspace 13, becoming purified by seeping through the filter element 7 and into space 18, out through port 21 and duct 20 and finally drawn off through the faucet C.

It will be noted that there is no reservoir other than that formed within the device itself, that the filter element is self-flushing or automatic in action, and that under ordinary circumstances a sufficient amount of water, (that will not require purification) will be run through the device to keep the filtering element in a sanitary condition.

Though a specific embodiment of the invention has been shown and described, it will be understood that many changes may be made without departing from the spirit of the invention.

I claim:

1. In a water filter, means for connecting same to a water supply pipe, consisting of a fitting attached thereto, a base casting for the filter secured to the bottom thereof, vertical parallel pipes connecting the said fitting to the said base casting, said vertical pipes affording means for circulating unfiltered water to and from the filter.

2. In a water filter connected to a water supply pipe, a fitting for making such connection, said fitting also constituting means for mounting the filter; means for connecting the filter to said fitting, said connecting means comprising hollow tubular members affording water circulation therethrough, to and from the filter, a faucet also associated with the fitting, a duct in the fitting communicating with the supply pipe, and a duct communicating with the said faucet, both of said ducts connected to the filter by means of the said tubular members.

3. A filter comprising a mounting base and a filtering element mounted thereon and an outer casing surrounding the filtering element, the filtering element having a central bore or passage, a pipe mounted on the base and extended up through the central bore of the filtering element, said base having an inlet duct extending from an inlet on the base to the lower end of said pipe, whereby the liquid supply may pass through the duct in the base to the lower end of said pipe and thence upwardly in the pipe the upper end of which communicates with a space above the filtering element so as to permit the liquid supply to flow over the top of the filtering element and thence downwardly on the outer side of the same, the base having an outlet nozzle communicating with the bottom of said outside space to permit unfiltered liquid to pass up through the pipe and thence outwardly to said outside space and thence outwardly through said outlet nozzle, said base also having a duct having an opening communicating with the lower end of the central bore of the filtering element, the base also having an outlet device at the other end of said last mentioned duct, whereby the liquid after passing up through the central pipe and into the outside space, may pass through the filtering element to be filtered and thence downwardly in the central bore thereof to said outlet duct and through the same to the outlet device thereon to permit the withdrawal of filtered liquid.

4. A filter having a base serving as a support for an outer casing and also for a filtering element arranged within the casing with a space between said element and the casing, said element having a central bore containing a supply pipe and the base having a supply duct running to the lower end of said pipe and also having an outlet duct extending down from the lower end of said outside space to an outlet device and also having another duct provided with an aperture communicating with the lower end of the filtering element bore and extending outward to a side outlet device.

5. A filter having a base serving as a support for a filtering element and its containing case, said base being provided on its opposite sides with nozzles one of which is a supply nozzle and the other an outlet nozzle, and a fitting arranged below said base and comprising a pair of pipes extending side by side and having their upper ends connected with and coupled to said nozzle devices, and a bottom member having sockets to receive said side by side pipes and also having an outlet nozzle or faucet and being provided with ducts from said faucet to each of said upright pipes to permit the faucet to discharge liquid from either of said pipes as desired.

In witness whereof, I hereunto subscribe my name this 9th day of December, A. D., 1929.

WILLIAM R. HILDEBRAND.